US006185327B1

(12) United States Patent
Niederbaumer et al.

(10) Patent No.: US 6,185,327 B1
(45) Date of Patent: Feb. 6, 2001

(54) METHOD AND SYSTEM FOR THE REDUCTION OF MEMORY CAPACITY REQUIRED FOR A DIGITAL REPRESENTATION OF AN IMAGE

(75) Inventors: James R. Niederbaumer, Webster; John R. D'Errico; Brian T. Pridham, both of Rochester, all of NY (US)

(73) Assignee: Eastman Kodak Company, Rochester, NY (US)

(*) Notice: Under 35 U.S.C. 154(b), the term of this patent shall be extended for 0 days.

(21) Appl. No.: 09/072,014

(22) Filed: May 4, 1998

(51) Int. Cl.[7] .................................................. G06K 9/00
(52) U.S. Cl. ........................ 382/168; 382/169; 382/251; 382/274
(58) Field of Search .................................. 382/168, 169, 382/251, 274, 232; 358/522

(56) References Cited

U.S. PATENT DOCUMENTS

| 5,410,617 | * | 4/1995 | Kidd et al. ............................. 358/466 |
| 5,426,517 | * | 6/1995 | Schwartz ............................... 358/520 |
| 6,038,341 | * | 3/2000 | Takeshima et al. .................. 382/168 |
| 6,091,853 | * | 7/2000 | Otto ...................................... 382/232 |

* cited by examiner

Primary Examiner—Phuoc Tran
(74) Attorney, Agent, or Firm—Peyton C. Watkins

(57) ABSTRACT

A method for reducing a bit depth of an image to reduce storage memory, the method comprises the steps of creating a histogram of an image; modifying the histogram so that a maximum slope of a to-be-calculated cumulative histogram will be no greater than substantially 1.0; (c) calculating the cumulative histogram from the modified histogram; and (d) interpreting the cumulative histogram to give a desired bit depth reduction.

42 Claims, 3 Drawing Sheets

METHOD AND SYSTEM FOR THE REDUCTION OF MEMORY CAPACITY REQUIRED FOR A DIGITAL REPRESENTATION OF AN IMAGE

APPENDIX

The disclosure in the appendix of this patent disclosure of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

FIELD OF INVENTION

The invention relates generally to the field of digital image compression and, more particularly, to such compression that maintains details of high-contrast portions of a digital image by creating a unique compression method for each image.

BACKGROUND OF THE INVETION

The storage of high resolution digital images within a digital still camera system typically requires substantial memory. For a single sensor camera, a typical image with a resolution of 768 pixels per line ×512 lines ×10 bits per pixel would require 3,932,160 bits or, equivalently, 491,520 bytes of semiconductor memory storage space. If, for system requirements, each 10 bit pixel value must be stored in a 16 bit word of memory (wasting 6 bits per word), the required amount of memory to store the entire image increases to 786,432 bytes. If the data could be transformed in some reversible manner to require only 8 bits (1 byte) per pixel, without significantly degrading image quality, then only 393,216 bytes of memory are required for a 50% savings of storage memory.

Logarithm transforms have been used in the past to transform ten bit pixel values into eight bit pixel values. Typically one would use an expression such as Equation 1 to map 10 bit linear exposure data into 8 bit logarithmic exposure data.

$$y = \text{round}\left[\frac{25.5}{\log_{10}(2)} \log_{10}(x+1)\right], 0 \leq x \leq 1023 \quad (1)$$

In Equation 1, "x" is the 10 bit linear exposure value, "y" is the corresponding 8 bit logarithmic value and "round" rounds the result to the nearest integer. Equation 1 can be inverted to produce Equation 2 for transforming a 8 bit logarithmic value to a ten bit linear exposure value.

$$x = \text{round}\left[\text{antilog}_{10}\left(\frac{\log_{10}(2)}{25.5} y\right) - 1\right], 0 \leq y \leq 255 \quad (2)$$

Although the presently known and utilized method for data transformation is satisfactory, it is not without drawbacks. The present digital compression does not account for the scene contents of the image so that details in high contrast areas may be lost if the code values in this area are quantized to a narrow range of output code values.

Consequently, a need exists for a method and apparatus for the compression of imaging data for overcoming the above-described drawbacks.

SUMMARY OF THE INVENTION

The present invention is directed to overcoming one or more of the problems set forth above. Briefly summarized, according to one aspect of the present invention, the invention resides in a method for reducing a bit depth of an image to reduce storage memory, the method comprising the steps of: (a) creating a histogram of an image; (b) modifying the histogram so that a maximum slope of a to-be-calculated cumulative histogram will be no greater than substantially 1.0; (c) calculating the cumulative histogram from the modified histogram; and (d) interpreting the cumulative histogram to give a desired bit depth reduction.

ADVANTAGEOUS EFFECT OF THE INVENTION

The present invention has the following advantages of providing customized compression for each image so that scene content is not degraded.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
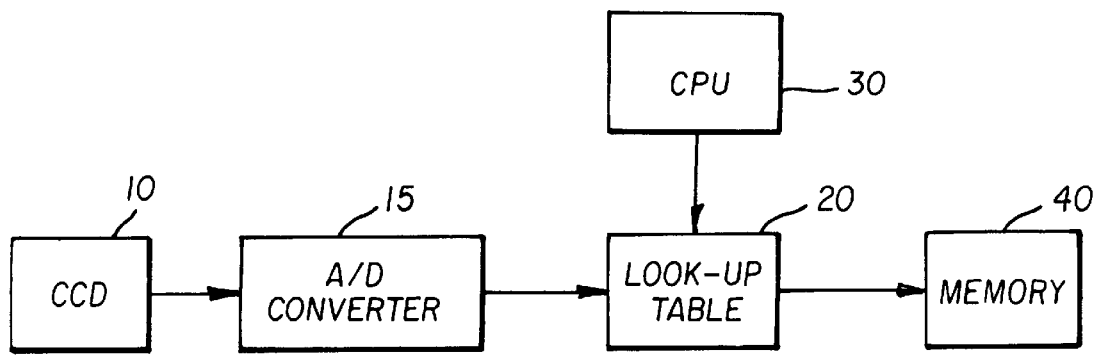
FIG. 1 is a schematic diagram illustrating one embodiment of the present invention.

Referring to FIG. 1, there is illustrated a charge-coupled device (CCD) 10 for receiving and capturing an incident image in electronic form and then converting the image via an analog to digital converter (A/D converter) 15 into ten bit digital form. The digital representation of the image is electronically sent to a look up table 20 for conversion of the ten bit digital image into an eight bit digital image. The look-up table (LUT) 20 is electrically connected to and created by a central processing unit (CPU) 30 which utilizes a data compression method of the present invention and is described in detail below.

Once the data is converted to eight bit data, it is stored in memory 40 for later use. It is instructive to point out, although obvious to those skilled in the art, that data stored in eight bit form utilizes less memory than ten bit data. It is also instructive to note that the reduction of data from ten bit to eight bit is for purposes of illustration, and that the reduction may be utilized on any size bit data. It further facilitates understanding to note that for brevity only one color channel is illustrated hereinbelow, although those skilled in the art will recognize that, depending on the color space utilized, there are typically three or more color channels, for example a three color channel having red, green, and blue (RGB) color channels. Therefore, the process described below will be applied to each color channel.

Figure 2:
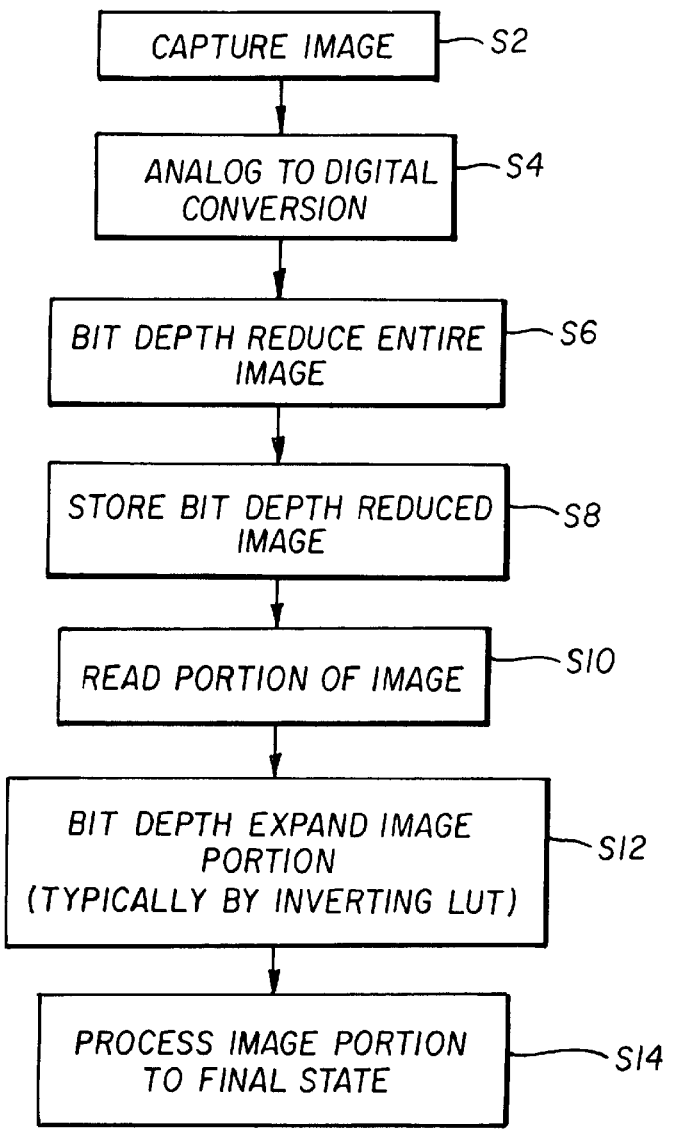
FIG. 2 is a flowchart illustrating the steps of the present invention.

Referring now to FIG. 2, there is illustrated a flow chart of the software program of the present invention for converting ten bit data into eight bit data; the computer program of the present invention written in MATLAB language is contained in Appendix A. A scene is first captured S2 by any suitable means, such as by a digital or conventional camera. If a conventional camera is used, the image is passed through an analog to digital converter for converting the analog data into digital form S4. If a digital camera is used, the data is received in digital form from the digital camera as illustrated by the combination of the CCD 10 and the A/D converter 15. The ten bit data is then converted to eight bit S6 for efficient use of memory 40. The software creates a unique LUT containing the ten to eight bit reduction data for each image based on an analysis of the image. The eight bit data is then stored in memory S8 for later use in processing an image.

When the image is to be used, the image is retrieved S10 in portions, typically 8×8 pixels. The image is expanded S12 portion by portion back into ten bit data, typically by inverting the LUT created in reducing the bit depth. Each 8–8 pixel portion is then converted back into a reproduction of the stored image S14.

Figure 3:
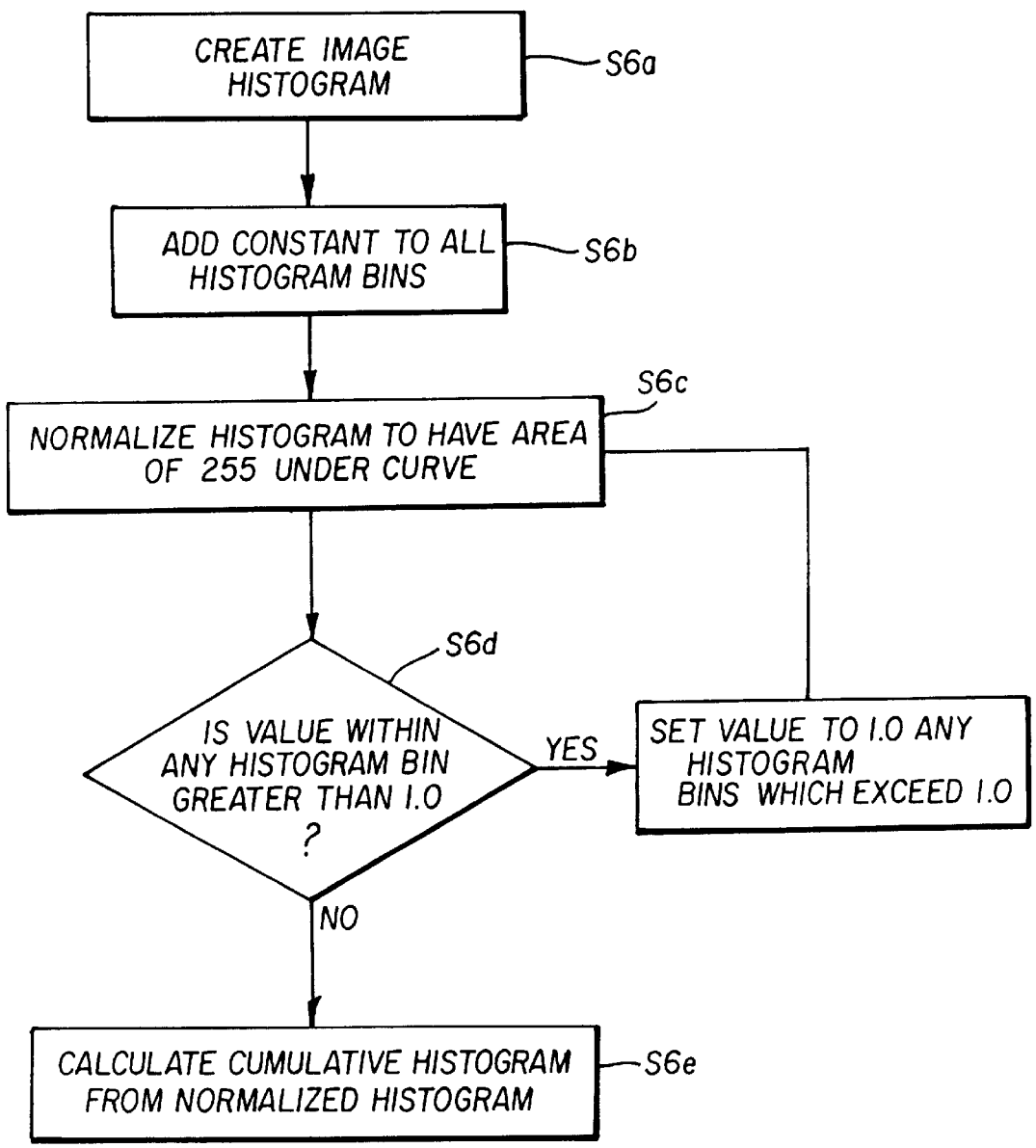
FIG. 3 is an exploded flowchart of a potion of FIG. 2.
Figure 4A:
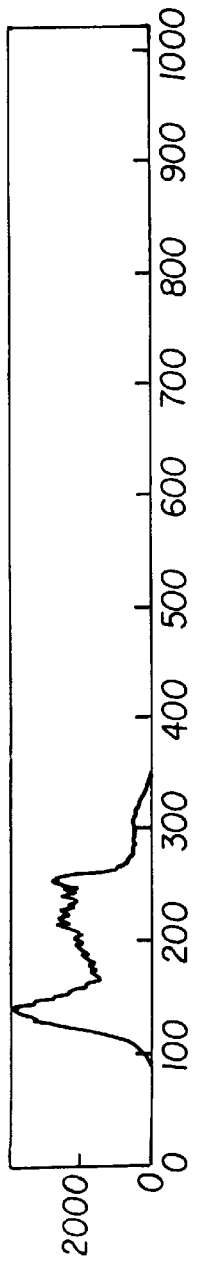
FIGS. 4A–4E are graphs illustrating a portion of the steps of FIG. 3.

Referring to FIG. 3, there is illustrated a detailed flowchart of step 6 of reducing the bit depth. In this regard, an intensity histogram (a typical histogram for one color channel is shown in FIG. 4A) is created S6a from the incoming digital image which histogram, as is well known in the art, includes pixel code values on the abscissa and the number of pixels on the ordinate. It facilitates understanding to note that a histogram is to be formed from each color channel; however, only one color is being illustrated for brevity. It is also instructive to note that, in lieu of using three histograms, one for each channel, a single histogram created from one of the channels could be applied to all the channels. Likewise, a single histogram could be created from a combination of all the color channels. Still further, in lieu of using each pixel to create the histogram, a sample of the pixels may be used in creating the histogram. All these variations can be created by those skilled in the art.

Figure 4B:
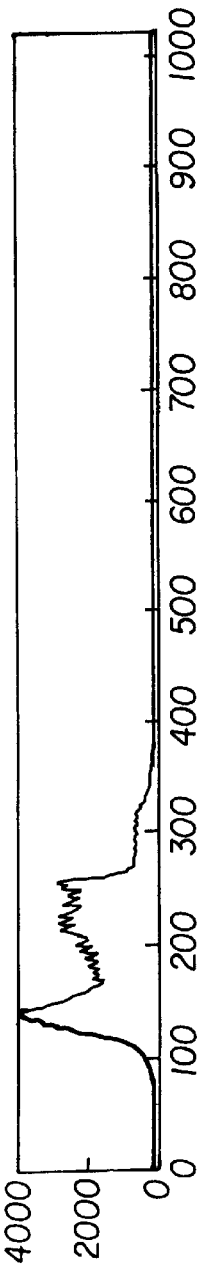
Figure 4C:
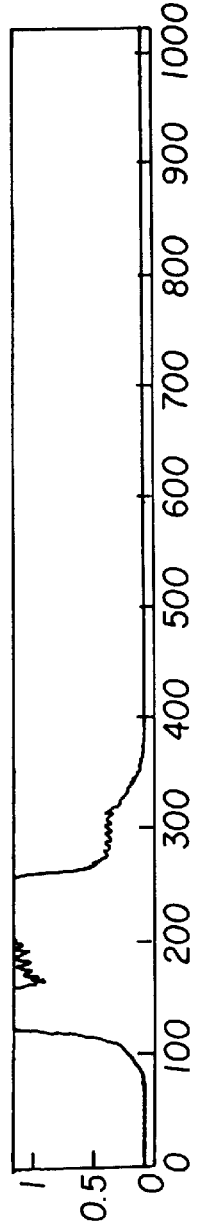

The intensity histogram is then modified S6b so that there are no zero bins in the histogram (see FIG. 4B) for forming a non-zero bin histogram. This is accomplished by adding a constant (typically in the range of 0.01% to 0.1% of the total number of pixels in the image) to the original histogram of FIG. 4A The non-zero bin histogram is then modified into a modified intensity histogram so that a to-be-calculated cumulative histogram has a slope no greater than 1.0. To create the modified cumulative histogram, the intensity histogram is normalized S6c to an area of 255 (based upon a reduction to 8 bits) by the following equation which is graphically illustrated in FIG. 4C:

$$k_i = 255 \frac{h_i}{\sum_{j=0}^{1023} h_j} \quad (3)$$

where $k_i$ is the value in bin i of an area normalized histogram; $h_i$ is the value in bin i of the non-zero bin histogram on the first iteration, and on all subsequent iterations, is the smaller of $k_i$ and 1.0.

Figure 4D:
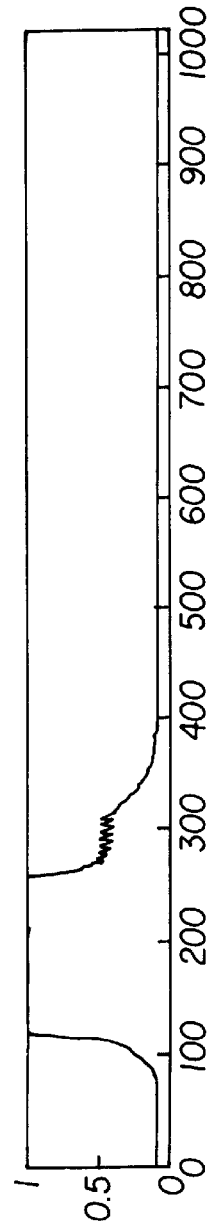

This converts the scale of the ordinate into a form in which the majority of the data is below 1.0 of the ordinate. The bins with values above 1.0 are then truncated to 1.0 and the resultant data is again input S6d into Eq. 3. This process is repeated until the data returns a result in which no bins have a value exceeding 1.0 plus a small tolerance (typically 0.0001), which is graphically illustrated in FIG. 4D. It is instructive to note that the intensity histogram input into Eq. 3 may return a result of all the data below 1.0 in the first iteration in which case no additional iterations will be necessary, as those skilled in the art will recognize.

Figure 4E:
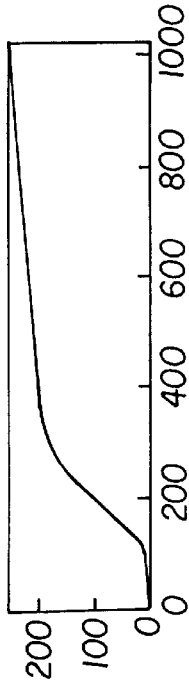

Finally, a cumulative histogram (the to-be-calculated cumulative histogram previously mentioned) is calculated S6e by means well known in the art, which cumulative histogram is illustrated in FIG. 4E. As is well known in the art, the ordinate of the cumulative histogram is the number of cumulative pixels and the abscissa is the bin value. It should be noted that the cumulative does not have any point which includes a slope greater than 1.0.

However, it will be appreciated that variations and modifications can be effected by a person of ordinary skill in the art without departing from the scope of the invention.

parts List:
 10 charge-coupled device
 15 analog to digital converter
 20 look-up table
 30 CPU
 40 memory

What is claimed is:

1. A method for reducing a bit depth of an image to reduce storage memory, the method comprising the steps of:
 (a) creating a histogram of an image;
 (b) modifying the histogram so that a maximum slope of a to-be-calculated cumulative histogram will be no greater than substantially 1.0;
 (c) calculating the cumulative histogram from the modified histogram; and
 (d) interpreting the cumulative histogram to give a desired bit depth reduction.

2. The method as in claim 1 further comprising creating a look-up-table including the results of step (d).

3. The method as in claim 2 further comprising the step of processing the image through the look-up-table.

4. The method as in claim 1, wherein step (b) includes using an equation of a form $$k_i = 255 \frac{h_i}{\sum_{j=0}^{1023} h_j}$$

for creating a modified histogram from which the cumulative histogram will be created.

5. The method as in claim 4, wherein step (b) includes truncating data from the equation having values above substantially 1.0.

6. The method as in claim 4 further comprising adding a constant to the histogram for forming a modified histogram.

7. The method as in claim 6, wherein step (b) includes normalizing an area under the modified histogram.

8. The method as in claim 6, wherein step (b) includes normalizing an area under the histogram to substantially 255.

9. The method as in claim 1, wherein step (a) includes creating a plurality of histograms, one for each color channel.

10. The method as in claim 1, wherein step (a) includes creating a single histogram from a single color channel and then applying the single histogram to each color channel.

11. The method as in claim 1, wherein step (a) includes creating a single histogram from a combination of all color channels and applying the single histogram to each color channel.

12. The method as in claim 9 further comprising sampling pixels from the image and creating the plurality of histogram from the sampled pixels.

13. The method as in claim 10 further comprising sampling pixels from the image and creating the single histogram from the sampled pixels.

14. The method as in claim 11 further comprising sampling pixels from the image and creating the single histogram from the sampled pixels.

15. A computer program product for reducing a bit depth of an image to reduce storage memory, comprising a computer readable storage medium having a computer program stored thereon for performing the steps of:
(a) creating a histogram of an image;
(b) modifying the histogram so that a maximum slope of a to-be-calculated cumulative histogram will be no greater than substantially 1.0;
(c) calculating the cumulative histogram from the modified histogram; and
(d) interpreting the cumulative histogram to give a desired bit depth reduction.

16. The computer program product as in claim 15 further comprising creating a look-up-table including the results of step (d).

17. The computer program product as in claim 16 further comprising the step of processing the image through the look-up-table.

18. The computer program product of claim 15, wherein step (b) includes using an equation of a form $$k_i = 255 \frac{h_i}{\sum_{j=0}^{1023} h_j}$$

for creating a modified histogram from which the cumulative histogram will be created.

19. The computer program product as in claim 18, wherein step (b) includes truncating data from the equation having values above substantially 1.0.

20. The computer program product as in claim 18, further comprising adding a constant to the histogram for forming a modified histogram.

21. The computer program product as in claim 20, wherein step (b) includes normalizing an area under the modified histogram.

22. The computer program product as in claim 20, wherein step (b) includes normalizing an area under the histogram to substantially 255.

23. The computer program product as in claim 15, wherein step (a) includes creating a plurality of histograms, one for each color channel.

24. The computer program product as in claim 15, wherein step (a) includes creating a single histogram from a single color channel and then applying the single histogram to each color channel.

25. The computer program product as in claim 15, wherein step (a) includes creating a single histogram from a combination of all color channels and applying the single histogram to each color channel.

26. The computer program product as in claim 23 further comprising sampling pixels from the image and creating the plurality of histogram from the sampled pixels.

27. The computer program product as in claim 24 further comprising sampling pixels from the image and creating the single histogram from the sampled pixels.

28. The computer program product as in claim 25 further comprising sampling pixels from the image and creating the single histogram from the sampled pixels.

29. A system for reducing a bit depth of an image to reduce storage memory, the system comprising:
(a) means for creating a histogram of an image;
(b) means for modifying the histogram so that a maximum slope of a to-be-calculated cumulative histogram will be no greater than substantially 1.0;
(c) means for calculating the cumulative histogram from the modified histogram; and
(d) means for interpreting the cumulative histogram to give a desired bit depth reduction.

30. The system as in claim 29 further comprising means for creating a look-up-table including the results of the interpreting means.

31. The system as in claim 30 further comprising means for processing the image through the look-up-table.

32. The system of claim 31, wherein the modifying means includes means for using an equation of a form $$k_i = 255 \frac{h_i}{\sum_{j=0}^{1023} h_j}$$

for creating a modified histogram from which the cumulative histogram will be created.

33. The system as in claim 32, wherein the modifying means includes means for truncating data from the equation having values above substantially 1.0.

34. The system as in claim 32 further comprising means for adding a constant to the histogram for forming a modified histogram.

35. The system as in claim 34, wherein the modifying means includes means for normalizing an area under the modified histogram.

36. The system as in claim 34, wherein the modifying means includes means for normalizing an area under the histogram to substantially 255.

37. The system as in claim 29, wherein the creating the histogram means includes means for creating a plurality of histograms, one for each color channel.

38. The system as in claim 29, wherein the creating the histogram means includes means for creating a single histogram from a single color channel and then means for applying the single histogram to each color channel.

39. The system as in claim 29, wherein the creating the histogram means includes means for creating a single histogram from a combination of all color channels and means for applying the single histogram to each color channel.

40. The system as in claim 37 further comprising means for sampling pixels from the image and means for creating the plurality of histogram from the sampled pixels.

41. The system as in claim 38 further comprising means for sampling pixels from the image and means for creating the single histogram from the sampled pixels.

42. The system as in claim 39 further comprising means for sampling pixels from the image and means for creating the single histogram from the sampled pixels.

* * * * *